(12) United States Patent
Koshida et al.

(10) Patent No.: US 9,334,391 B2
(45) Date of Patent: May 10, 2016

(54) SINTERED SPHERICAL BN PARTICLES, METHOD OF PRODUCING THE SAME, AND POLYMER MATERIAL

(71) Applicant: MIZUSHIMA FERROALLOY CO., LTD., Kurashiki-shi, Okayama (JP)

(72) Inventors: Takahisa Koshida, Kurashiki (JP); Syunji Kasahara, Satosho-cho (JP); Shoichi Hiwasa, Kurashiki (JP)

(73) Assignee: MIZUSHIMA FERROALLOY CO., LTD., Okayama (JP)

( * ) Notice: Subject to any disclaimer, the term of this patent is extended or adjusted under 35 U.S.C. 154(b) by 0 days.

(21) Appl. No.: 14/406,928

(22) PCT Filed: Jun. 25, 2013

(86) PCT No.: PCT/JP2013/067961
§ 371 (c)(1),
(2) Date: Dec. 10, 2014

(87) PCT Pub. No.: WO2014/003193
PCT Pub. Date: Jan. 3, 2014

(65) Prior Publication Data
US 2015/0152251 A1 Jun. 4, 2015

(30) Foreign Application Priority Data
Jun. 27, 2012 (JP) ................................. 2012-144606

(51) Int. Cl.
C08K 3/38 (2006.01)
C08K 7/18 (2006.01)
C04B 35/626 (2006.01)
C04B 35/628 (2006.01)
C01B 21/064 (2006.01)
C08K 7/04 (2006.01)

(52) U.S. Cl.
CPC .............. *C08K 7/18* (2013.01); *C01B 21/0648* (2013.01); *C04B 35/626* (2013.01); *C04B 35/628* (2013.01); *C08K 3/38* (2013.01); *C01P 2004/03* (2013.01); *C01P 2004/30* (2013.01); *C01P 2004/32* (2013.01); *C01P 2004/61* (2013.01); *C01P 2006/12* (2013.01); *C01P 2006/21* (2013.01); *C01P 2006/32* (2013.01); *C01P 2006/80* (2013.01); *C08K 7/04* (2013.01); *C08K 2003/385* (2013.01); *Y10T 428/2982* (2015.01)

(58) Field of Classification Search
CPC ......... C08K 3/38; C08K 7/18; C01B 21/0648
USPC ................. 523/223; 241/3; 264/670; 428/402
See application file for complete search history.

(56) References Cited

U.S. PATENT DOCUMENTS

| | | | |
|---|---|---|---|
| 5,854,155 A | 12/1998 | Kawasaki et al. | |
| 6,054,520 A | 4/2000 | Washio et al. | |
| 6,096,671 A | 8/2000 | Kawasaki et al. | |
| 2006/0121068 A1 | 6/2006 | Sane et al. | |
| 2006/0127422 A1 | 6/2006 | Lodyga et al. | |
| 2012/0046387 A1 | 2/2012 | Chu et al. | |
| 2012/0141348 A1 | 6/2012 | Yoshihara et al. | |
| 2012/0230786 A1 | 9/2012 | Matsuda et al. | |
| 2013/0012621 A1 | 1/2013 | Yamamoto et al. | |

FOREIGN PATENT DOCUMENTS

| | | |
|---|---|---|
| CN | 101035876 A | 9/2007 |
| CN | 102482087 A | 5/2012 |
| JP | A-63-274603 | 11/1988 |
| JP | A-1-103959 | 4/1989 |
| JP | A-5-853 | 1/1993 |
| JP | H07-35303 B2 | 4/1995 |
| JP | A-9-202663 | 8/1997 |
| JP | A-11-60216 | 3/1999 |
| JP | B2-3461651 | 10/2003 |
| JP | A-2010-76955 | 4/2010 |
| JP | A-2011-176024 | 9/2011 |
| WO | WO 2012/053507 A1 | 4/2012 |

OTHER PUBLICATIONS

Office Action issued in Japanese Application No. 2013-556452 dated Feb. 18, 2014 (with translation).
Office Action issued in Japanese Application No. 2013-556452 dated Jul. 22, 2014 (with translation).
International Search Report issued in International Application No. PCT/JP2013/067961mailed Sep. 17, 2013.
Aug. 25, 2015 Office Action issued in Chinese Patent Application No. 201380031031.7.
Feb. 22, 2016 extended European Search Report issued in European Application No. 13810736.2.

*Primary Examiner* — Edward Cain
(74) *Attorney, Agent, or Firm* — Oliff PLC

(57) ABSTRACT

Sintered spherical BN particles having secondary particles formed of aggregated primary BN particles, in which the number ratio of particles, each having a recess on its surface is 50% or more in the sintered spherical BN particles, and each of the sintered spherical BN particles has a compressive strength of 0.1 MPa to 100 MPa. The sintered spherical BN particles are not only excellent in heat dissipation properties and adhesiveness, but also have high compressive strength, and therefore, show a small variation in heat dissipation properties and is free from conduction failure, which would otherwise be caused by exfoliation of the copper foil, when used as a filling material for a polymer composite material.

20 Claims, 5 Drawing Sheets

SINTERED SPHERICAL BN PARTICLES, METHOD OF PRODUCING THE SAME, AND POLYMER MATERIAL

TECHNICAL FIELD

The present invention relates to sintered spherical BN particles that are preferably used as a filling material for improving heat dissipation properties of a polymer material such as resin and rubber used in electronic components, and a method of producing the same.

The present invention also relates to a polymer material that is obtained by filling a material such as resin and rubber with the aforementioned sintered spherical BN particles.

BACKGROUND ART

In the field of semiconductors such as LEDs and power modules, higher degree of integration and power density are increasingly demanded, techniques of heat dissipation in the periphery of an integrated circuit are gaining greater importance as a factor determining such performance measures.

In particular, since organic materials used in implementation are difficult to conduct heat, the need for improved heat dissipation properties becomes more pronounced as the degree of integration increases.

Conventionally, silica and alumina have been used as materials with improved heat dissipation properties as mentioned above, in terms of price, stability of their quality, and their compatibility with resin.

However, with the aforementioned conventional materials, attempts have been made to improve performance by spheroidization, optimization of particle size distribution, and so on, yet there are limits on the improvement.

Therefore, there is an increasing demand for a new filling material obtained by changing the blank material itself.

Accordingly, AlN, MgO, BeO, and BN have newly gained increased attention as inorganic materials with high thermal (heat) conductivity.

Among others, BN is excellent in its insulating properties, environmental stability, and moisture absorption resistance, and has been studied as a most promising candidate.

However, BN particles are scaly, and have hexagonal crystal structure, which shows anisotropic, and thus unstable properties, leading to the problem of being unable to fully make use of potential properties of BN.

In addition, surfaces of BN particles involve a small number of functional groups and have poor adhesiveness to the base polymer material. Thus, a crack occurs in the interface between a BN particle and the polymer material, which causes separation of a copper foil from the polymer material easily at the interface with reduced strength in the presence of the BN particle. This results in another problem of causing exfoliation of the copper foil as a circuit during use, leading to conduction failure.

To date, many improvements have been made to BN particles in order to address the aforementioned difficulties.

For example, JPH1160216A (PTL 1) proposes a method of forming a polymer composite material such that a-axis of BN particles is aligned perpendicular to the heat dissipating route.

In addition, JP3461651B (PTL 2) proposes a method in which BN powder is formed of aggregates such that the particles are isotropic.

Moreover, JP201076955A (PTL 3) proposes a method of reducing the particle size of BN particles so as to obtain less anisotropic particles.

The aforementioned methods can indeed produce some degree of improving effects. However, they are not still sufficient in terms of heat dissipation properties and adhesiveness.

CITATION LIST

Patent Literature

PTL 1: JPH1160216A
PTL 2: JP3461651B
PTL 3: JP201076955A
PTL 4: JP2011176024A

SUMMARY OF INVENTION

Technical Problem

As shown in the above-identified patent documents, attempts have been made to achieve significant improvement of properties of BN particles over the conventional scaly BN particles, by improving the arrangement and anisotropic properties thereof.

However, for broader application in the electronics field, further quality control and stabilization are required. On the other hand, the problems of poor adhesiveness to the polymer material and exfoliation of the copper foil as a circuit during use, which would easily cause conduction failure, still remain unsolved.

The present invention solves the aforementioned problems in an advantageous manner. An object of the present invention is to provide sintered spherical BN particles that are not only excellent in heat dissipation properties and adhesiveness, but also have high compressive strength, and therefore, show a small variation in heat dissipation properties and is free from conduction failure, which would otherwise be caused by exfoliation of the copper foil, when used as a filling material for a polymer composite material, and an advantageous method of producing the same.

Another object of the present invention is to propose a polymer material filled with the aforementioned sintered spherical BN particles in a dispersed manner.

Solution to Problem

To identify the causes of variations in heat dissipation properties and adhesiveness, the inventors of the present invention investigated the product properties of BN particles and the conditions of dispersion thereof in the polymer material. As a result, the inventors discovered that one of the causes is shearing force acting on BN particles when composited (kneaded) with the polymer material, causing particles to deform and collapse.

The inventors also found that the collapse that occurs due to the collision of BN particles occurring when they are kneaded with the polymer material is another cause that would generate fine powder and lead to deterioration in heat-sink properties and adhesiveness.

The inventors of the present invention intensely investigated how to resolve the above problems.

Firstly, the inventors believed that spheroidizing BN particles would be effective for preventing deformation and/or collapse of particles caused by shearing force applied by the polymer material and/or collision of particles (e.g., JP2011176024A (PTL 4)).

However, satisfactory results could not necessarily be obtained by simply spheroidizing particles.

Meanwhile, during the process of preparing the aforementioned spherical BN particles, hollow spherical particles having spaces inside, solid particles filled with matter throughout, and even spherical particles having partially recessed surfaces were formed in response to the changes in manufacturing conditions.

Then, the inventors studied the product characteristics for each of the three types of spherical particles, and revealed the following findings.

First, it was found that hollow spherical particles were so low in compressive strength that they could not avoid deformation and/or collapse due to shearing force applied by the polymer material and/or collision of particles.

Second, it was found that solid spherical particles were high in compressive strength, yet had a problem with adhesiveness to the polymer material.

In this regard, spherical particles, each having a recess on its surface were found to exhibit sufficient compressive strength, and to be quite satisfactory in adhesiveness to the polymer material.

The present invention was completed based on these findings.

Specifically, main features of the present invention are as follows.

1. Sintered spherical BN particles comprising secondary particles formed of aggregated primary BN particles, wherein the number ratio of particles, each having a recess on its surface, is 50% or more in the sintered spherical BN particles, and each of the sintered spherical BN particles has a strength of 0.1 MPa to 100 MPa.

2. The sintered spherical BN particles according to aspect 1, wherein the sintered spherical BN particles have an average particle size of 1 µm to 100 µm.

3. The sintered spherical BN particles according to aspect 1 or 2, wherein the sintered spherical BN particles have a carbon content of 0.1 mass % or less and a specific surface area of 1 $m^2/g$ to 20 $m^2/g$.

4. The sintered spherical BN particles according to any one of aspects 1 to 3, wherein conductive impurities are present as a composite oxide with $B_2O_3$ in the spherical BN particles in stable state.

5. A method of producing sintered spherical BN particles, comprising:

blending BN particles containing primary particles having a major diameter of 0.01 µm to 5.0 µm with 0.1 mass % to 10 mass % of boron carbide ($B_4C$) as a sintering additive and 0.1 mass % to 5.0 mass % of an organic binder as a molding additive, and then adding water to form a slurry having a viscosity of 0.01 Pa·s to 5.0 Pa·s;

using a spray drying process to spray-dry the slurry at a drying temperature of 100° C. to 300° C. to form spherical BN granules;

baking the spherical BN granules at a temperature of 1600° C. to 2200° C.; and then, optionally, grinding or crushing the baked spherical BN granules.

6. The method of producing sintered spherical BN particles according to aspect 5, wherein polyvinyl alcohol (PVA) with a polymerization degree of 500 to 2000 is used as the organic binder.

7. The method of producing sintered spherical BN particles according to aspect 5 or 6, wherein the primary BN particles have a specific surface area of 10 $m^2/g$ to 70 $m^2/g$ and an oxygen content of 1 mass % to 7 mass %.

8. A polymer material obtained by dispersing the sintered spherical BN particles according to any one of aspects 1 to 4 in a resin or a rubber.

Advantageous Effect of Invention

When a polymer material such as a resin is filled with the sintered spherical BN particles according to the present invention in a dispersed manner, exfoliation of the copper foil circuit will not occur in use, since the BN particles show high adhesiveness to the resin under the influence of the anchoring effect of recesses, and heat dissipation can be maximized because of the high compressive strength and high spherical stability of the BN particles.

In addition, the polymer material filled with the sintered spherical BN particles according to the present invention may be used effectively, in particular, as insulating material for electrical and electronic components generating a large amount of heat, such as LEDs and power modules.

BRIEF DESCRIPTION OF DRAWINGS

The present invention will be further described below with reference to the accompanying drawings, wherein.

DESCRIPTION OF EMBODIMENTS

The present invention will be described in detail below.

Generally, spherical BN particles are produced by the process including:

(1) preparing a slurry by dispersing fine BN particles in water;
(2) removing water from the slurry by the spray drying process to form granules; and
(3) baking the resulting powder.

To form a recess on the surface of a spherical BN particle according to the present invention, it is important to adjust the particle size of primary particles, the type of dispersant, the type of organic binder to be used as a molding additive when preparing a slurry, and the slurry viscosity.

In this regard, the water in the slurry evaporates slower as finer primary particles are used, with the result that a recess is formed more easily on the surface of a particle at the time of spray-drying. In addition, finer particles are more preferable for promoting sintering during the baking process. However, excessively fine particles would adversely affect the homogeneity of the resulting slurry. In view of the foregoing, it is necessary for primary particles to have a major diameter of 0.01 µm to 5.0 µm, preferably 0.05 µm to 1.0 µm.

In addition, the primary BN particles have a specific surface area of 10 $m^2/g$ to 70 $m^2/g$, preferably 20 $m^2/g$ to 50 $m^2/g$, and an oxygen content of 1 mass % to 7 mass %, preferably 2 mass % to 5 mass %. Setting the specific surface area and oxygen content within the aforementioned ranges yields improved sinterability of particles.

Moreover, in order to form a recess on the surface of a particle, it is necessary to dry the slurry during the spray drying process so rapidly that a film (shell) can form on the surface. If heating is continued with such a shell formed, in other words, with water trapped in the shell, the shell is ruptured by the pressure exerted by water vapor, and consequently a recess is formed.

This will be described in more detail below.

Droplets are sprayed into a dryer maintained at high temperature, where drying proceeds from the surface inward. Thus, when droplets are uniformly heated and dried to the inside, solid spherical particles form. Alternatively, when shells formed on the surfaces of particles are ruptured by the vapor pressure inside, spherical particles, each having a recess on its surface, form. Alternatively, when shells formed on the surfaces of particles have high strength and the solid content is low, hollow spherical particles form.

In this case, the shell strength is determined by the polymerization degree and the amount of the organic binder used.

For example, when polyvinyl alcohol (PVA) is used as the organic binder, the polymerization degree of PVA (molecular weight) is represented by (n+m) in the following formula:

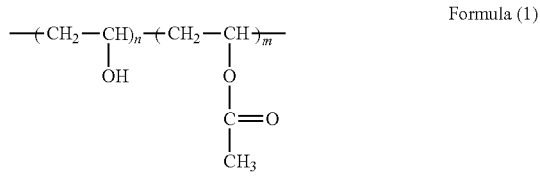

Formula (1)

Figure 1:
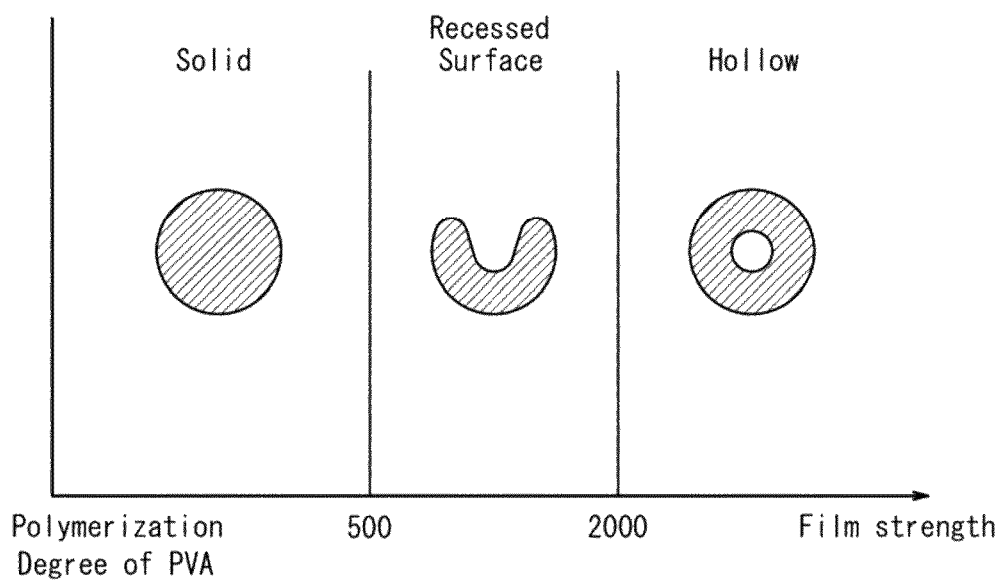
FIG. 1 shows the relationship between the polymerization degree of polyvinyl alcohol (PVA) and the shape of spherical BN granule.

Additionally, as shown in FIG. 1, it was also discovered that solid spherical particles form more easily when the aforementioned polymerization degree (n+m) is less than 500, and hollow spherical particles form more easily when the polymerization degree is more than 2000, whereas spherical particles, each having a recess on its surface, form more easily when the polymerization degree is in the range of 500 to 2000.

In addition, the addition amount of the organic binder needs to be in the range of 0.1 mass % to 5.0 mass % with respect to BN powder. If the addition amount of the organic binder is less than 0.1 mass %, it is not possible to hold BN particles together and shape retention cannot be obtained, while if the addition amount is more than 5.0 mass %, carbon in the organic binder remains as a residue. Thus, the addition amount of the organic binder is preferably in the range of 0.5 mass % to 3.0 mass %.

Note that other examples of the organic binder may include acrylic resin and cellulose.

In addition, the use of dispersant reduces the viscosity of the slurry, and is thus advantageous for forming a recess on the surface of a particle. Preferred dispersants are those which will be volatilized by baking and will not remain as a residue in particles, including alcohols, ethylene glycol, ethylene oxide, and the like.

Further, the addition amount of such a dispersant is preferably approximately in the range of 5 mass % to 20 mass % with respect to the amount of BN particles.

Next, the viscosity of the slurry is important for developing the conditions under which a shell forms on the surface of a particle and is allowed to trap water inside. That is, a slurry viscosity of less than 0.01 Pa·s does not provide a proper particle size, while a slurry viscosity of more than 5.0 Pa·s induces clogging at the nozzle outlet, and the like, preventing stable operation. Therefore, in the present invention, the slurry viscosity is limited in the range of 0.01 Pa·s to 5.0 Pa·s, and preferably in the range of 0.01 Pa·s to 1.0 Pa·s.

Note that the water content in the slurry is not particularly limited, as long as the aforementioned preferable viscosity is guaranteed.

It should be noted here that as the slurry contains more BN particles and the viscosity increases, it becomes harder for BN particles to travel, and the resulting surface shell becomes less tight and the diffusion rate of water vapor becomes faster, in which case solid particles form more easily. On the other hand, as the slurry contains less BN particles and the viscosity decreases, it becomes easier for BN particles to travel, and the resulting surface shell becomes tighter, in which case hollow particles form more easily.

According to the present invention, the slurry thus produced is subjected to spray granulation in a dry atmosphere to form spherical BN granules, each having a recess on its surface, where the spray granulation process is preferably performed by the spray drying process.

It is necessary to dry the slurry during the spray drying process so rapidly that a shell can form on the surface of a particle. To this end, spray-drying is preferably performed at a relatively high temperature. In this regard, if the spray drying process is carried out at temperatures of lower than 100° C., it becomes more difficult to form a surface shell with water being trapped therein, while the process is performed at temperatures of higher than 300° C., the resulting surface shell become more firm and a hollow product forms more easily. To this extent, if the spray drying process is performed at temperatures of 100° C. to 300° C., formation of a surface shell is promoted and water can be trapped therein, in which case a recess forms more easily on the spherical surface in response to the rupture of the surface shell. A preferred temperature range is 100° C. to 150° C.

Note that different blast nozzles for spraying the slurry are used for different target particle sizes, and in the case of particles having a medium particle size of around 50 μm in the present invention, nozzles of rotary-disc type and pressure nozzles are selectively used to control average particle size. In this case, the nozzle gas pressure for spraying the slurry is preferably produced by compressed air and is preferably as high as approximately 0.05 MPa to approximately 0.2 MPa.

In addition, the feed rate of the spraying nozzle is preferably approximately in the range of 1 kg/h to 10 kg/h. The feed rate is defined in relation to the amount of water evaporated by heated air. An excessively low feed rate results in lower productivity and larger variation in particle size, while an excessively high feed rate leads to an increase in water content of granules and insufficient drying.

In this way, spherical BN granules are prepared. Although not particularly limited, the spherical BN granules preferably have an average particle size of 1 μm to 100 μm, since a smaller average particle size tends to form solid products and a larger average particle size tends to form hollow products. A more preferred average particle size is 5 μm to 100 μm.

The baking process will now be described below.

The spherical BN granules obtained in this way are baked in a nitrogen atmosphere.

During the baking process, boron carbide ($B_4C$), which is blended as a sintering additive, reacts with $N_2$ in the atmosphere as shown in the following equation:

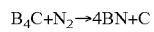

$B_4C + N_2 \rightarrow 4BN + C$

This reaction produces 4 mol of BN and 1 mol of C.

The oxygen in BN is removed by the carbon thus produced, and high purification proceeds.

In this case, the amount of boron carbide ($B_4C$) blended as the sintering additive is set to be 0.1 mass % to 10 mass % with respect to the BN powder of primary particles. If the amount of $B_4C$ blended is less than 0.1 mass %, sinterability is insufficient, and if the amount is more than 10 mass %, the strength is disadvantageously reduced after sintering.

In addition, the baking is performed at temperatures of 1600° C. to 2200° C. If the baking temperature is lower than 1600° C., the reaction shown in Formula (1) above does not complete, and if the baking temperature is higher than 2200° C., particles grow and coarsen, resulting in fewer junction points of particles and lower strength.

Figure 2:
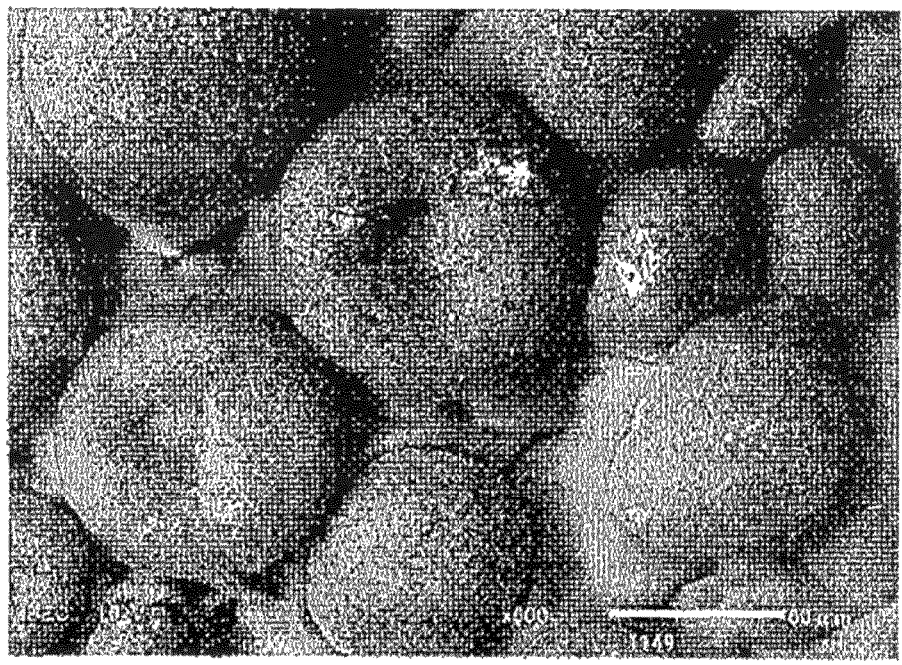
FIG. 2 is a micrograph (at 400× magnification) of sintered spherical BN particles according to the present invention.

Thus, tight, sintered spherical BN particles can be obtained as shown in FIG. 2.

Figure 3A:
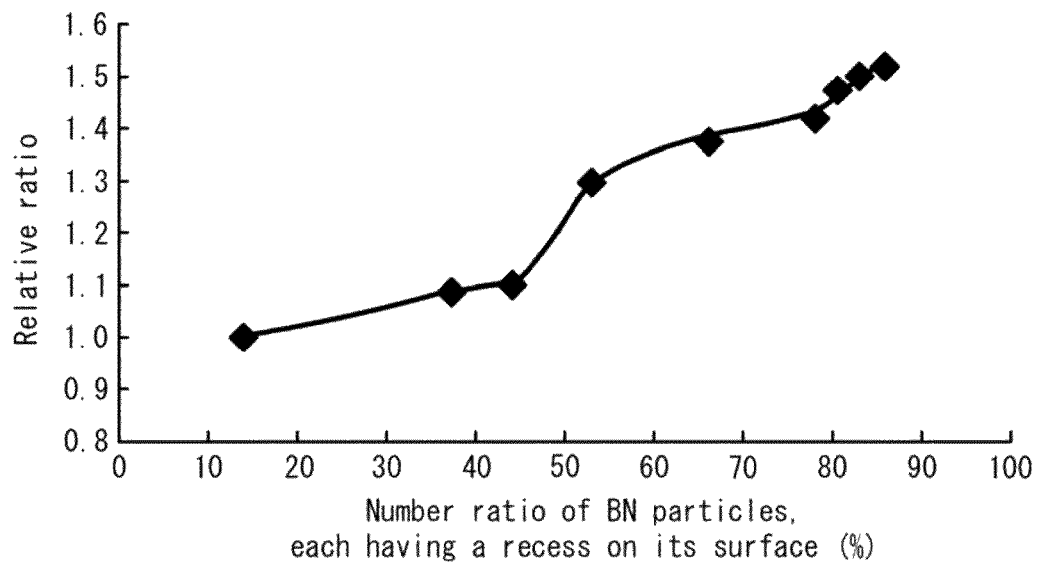
FIG. 3 shows the relationship of the number ratio of BN particles, each having a recess on its surface, the thermal conductivity, and the adhesive strength.

In this case, the number ratio of BN particles, each having a recess on its surface, is limited to 50% or more, because, as shown in FIG. 3(a), (b), when the number ratio of BN particles, each having a recess on its surface, is less than 50%, a sufficient anchoring effect cannot be obtained, and thus satisfactory thermal conductivity or adhesive strength cannot be achieved. A more preferred number ratio of BN particles, each having a recess on its surface, is 70% or more.

Figure 3B:
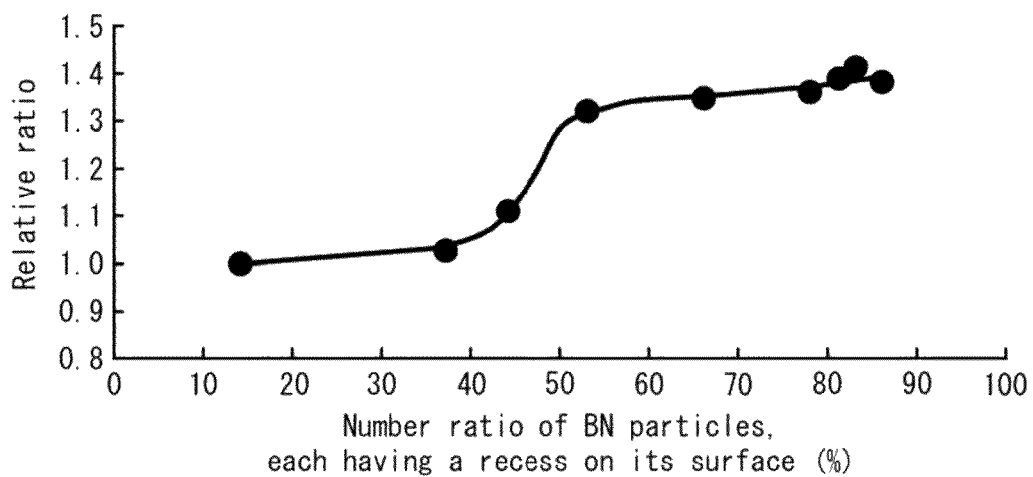

Note that FIG. 3 shows the measurements of thermal conductivity and of adhesive strength in terms of relative ratio, respectively, with a score of 1.0 representing the result of Comparative Example 6 in Example 2, which will be described later.

In addition, the number ratio of BN particles, each having a recess on its surface, is expressed relative to the total number of BN particles.

Referring again to FIG. 2, in the sintered spherical BN particles, only those BN particles oriented right-side up such that their recesses are positioned to face the microscope objective can be observed as having recesses on their surfaces, whereas BN particles oriented upside down cannot be observed as such even if they do. In this case, assuming the state where a recess is positioned to face the microscope objective as "right-side up" and the reverse as "upside down," and if the probabilities of observable, right-side up state and unobservable, upside down state are equal, then the number ratio of particles, each having a recess on its surface, is 50% or more in total, when the number ratio of particles, each having a recess on its surface, is 25% or more in the case of FIG. 2.

Figure 4:
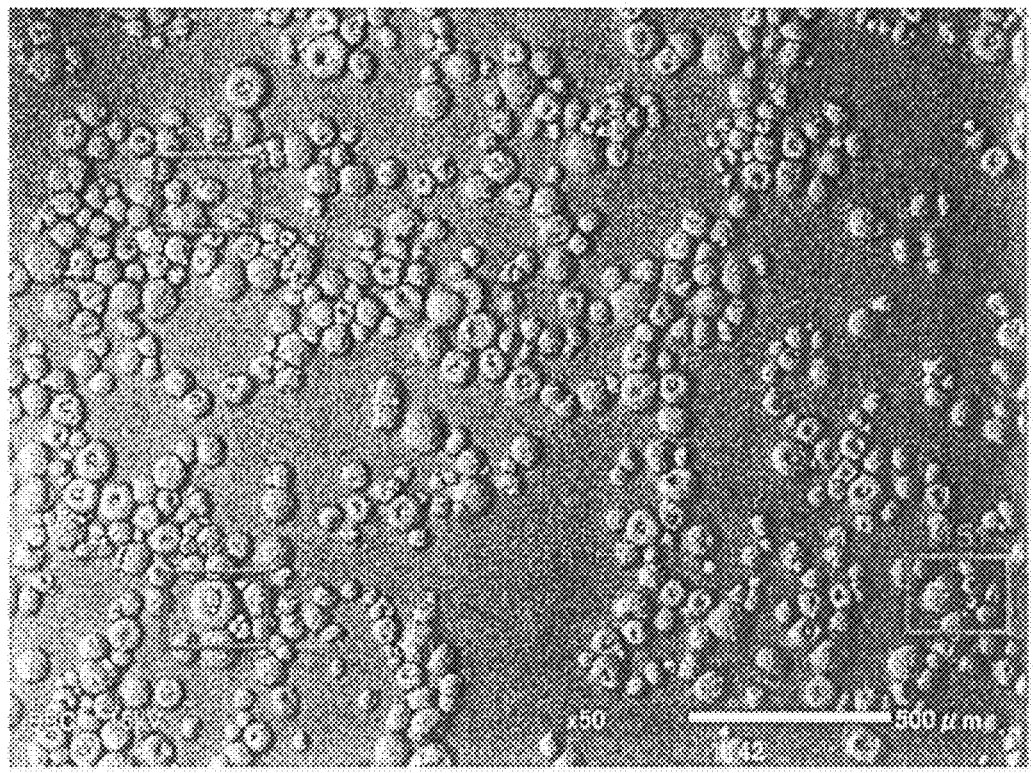
FIG. 4 is a micrograph (at 500× magnification) of surfaces of sintered spherical BN particles according to the present invention.

Further, FIG. 4 shows a micrograph for observing the surfaces of sintered spherical BN particles obtained according to the present invention. As shown in the figure, recesses on the surfaces of some sintered spherical BN particles can be clearly identified in the micrograph, and thus the number ratio of particles, each having a recess on its surface, is determined easily.

On the other hand, the compressive strength of the sintered spherical BN particles are limited in the range of 0.1 MPa to 100 MPa, because if the compressive strength is less than 0.1 MPa, deformation and/or collapse caused by shearing force applied by the polymer material and/or collision of particles cannot be avoided when the BN particles are composited with the polymer material, whereas a compressive strength as high as greater than 100 MPa is not necessarily required for applications of the present invention. The compressive strength is preferably 2 MPa to 40 MPa, and more preferably 10 MPa to 30 MPa.

It is preferred that the sintered spherical BN particles also have an average particle size of 1 μm to 100 μm, preferably 5 μm to 100 μm, and more preferably 10 μm to 80 μm, for the same reason as explained above in connection with the spherical granules. In this case, the diameter of a sintered spherical BN particle is defined by the distance D in FIG. 5.

Figure 5:
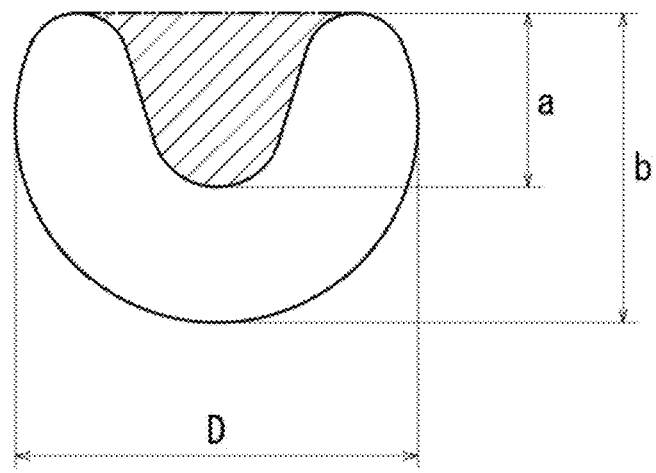
FIG. 5 schematically illustrates a sintered spherical BN particle according to the present invention.

As used herein, a void area as indicated by virtual line in FIG. 5 is called a "recess." The size of a recess is defined by the recess ratio a/b, where a is the recess depth and b is the contour height of the BN particle having the recess as shown in the figure. The recess size is set to be approximately in the range of 0.1 to 0.8. If the recess ratio a/b is less than 0.1, a sufficient anchoring effect cannot be obtained, and if the recess ratio is more than 0.8, the compressive strength is reduced. Note that the recess ratio a/b is more preferably in the range of 0.2 to 0.7.

Moreover, BN particles, which are originally insulative, are mixed with conductive impurities that are contained in the raw material or incorporated during the synthesizing process. The content of such impurities is preferably suppressed to 0.1 mass % or less when BN particles are used for electronic materials requiring high reliability.

Such impurities are composed mainly of C, and the C content needs to be 0.1 mass % or less, and preferably 0.05 mass % or less.

In addition to the above, by controlling the amount of BN powder as the base material, conductive impurities such as $Fe_2O_3$, $Cr_2O_3$, and NiO contained in the raw material may be present as a composite oxide (borate-based glass) with $B_2O_3$ in BN particles in stable state, and rendered harmless.

In particular, if $Al_2O_3$, $SiO_2$, CaO, $B_2O_3$, and the like are present in an amount equal to or greater than the equivalent in molar ratio of the conductive impurities, spheroidization as insulating impurities having a low melting point during the sintering process can be achieved. Therefore, it is preferred that oxides thereof are intentionally added to the base powder, if insufficient.

In addition, the thermal conductivity of the sintered spherical BN particles is determined by the growth level of primary particles and the occupancy of subsidiary pores. The growth of primary particles may be assessed by the specific surface area of the product. In this case, particles coarsen as they grow, and the specific surface area decreases and the thermal conductivity improves, whereas the adhesiveness deteriorates due to reduced adhesion points to the resin. Thus, in terms of balancing these properties, the specific surface area is preferably in the range of 1 $m^2$/g to 20 $m^2$/g, and preferably in the range of 5 $m^2$/g to 15 $m^2$/g.

Note that the occupancy of subsidiary pores (usually, 0.3 μm or less) that are generated as primary particles grow is determined by the particle size of primary particles, and is preferably set to be 50 vol % or less.

Further, according to the present invention, a resin or rubber may be filled with the sintered spherical BN particles thus obtained in a dispersed manner, thereby providing a polymer material for electronic members that shows excellent heat dissipation properties and insulating properties.

The sintered spherical BN particles according to the present invention have so high compressive strength that the particles cannot deform or collapse when composited with the polymer material due to shearing force applied by the polymer material and/or collision of particles.

In addition, when mixed with a polymer material such as resin, the sintered spherical BN particles according to the present invention exhibit increased adhesiveness to resin by virtue of the anchoring effect of recesses, which eliminates the risk of exfoliation of the copper foil circuit during use.

When the sintered spherical BN particles are used as a filler, it is desirable that the proportion of the aforementioned sintered spherical BN particles is set to be 50% or more, and preferably 70% or more in terms of the number ratio of BN particles, as mentioned above. This guarantees good thermal conductivity and adhesive strength at the same time.

It is also desirable that the filling rate of BN particles in the polymer material is preferably approximately 10 mass % to approximately 80 mass %, and more preferably approximately 20 mass % to approximately 70 mass %.

Note that examples of the polymer material may include thermosetting resin such as epoxy resin and phenol resin, thermoplastic resin such as polyethylene resin and polystyrene resin, and rubbers such as silicon rubber.

EXAMPLES

Example 1

As shown in Table 1, 2980 g (97.8 mass %) of BN powder samples different in primary particle size (major diameter), specific surface area, and oxygen content from one another were mixed with 20 g (0.6 mass %) of $B_4C$ passing 45 μm sieve and 50 g (1.6 mass %) of PVA with a polymerization degree of 1,000, respectively. Further, these mixed powder products were dispersed in 7000 g of pure water and mixed in a ball mill for 24 hours to produce slurry samples having a solid content of 30 mass % and a viscosity of 0.03 Pa·s to 0.08 Pa·s. Then, the slurry samples were processed by a spray dryer manufactured by Ohkawara Kakohki Co., Ltd., which was adjusted so as to produce particles such that each particle has a recess on its surface (the drying temperature was set to 115° C.). Consequently, 2163 g of powder with average particle size of 46 μm to 74 μm was recovered for each sample.

Then, the recovered powder was loaded to a graphite crucible, where the recovered powder was subjected to baking in a nitrogen atmosphere at 2000° C. for 10 hours. Consequently, 1543 g of sintered BN powder was obtained for each sample.

In some of the powder products thus obtained, chunks of lightly bound particles were observed. Accordingly, the power products were crushed in a hammer mill with a screen size of 1 mm in diameter, and the crushed powder products were then filtered through a vibrating sieve (with diameter of 106 μm) to remove coarse particles.

In this way, sintered spherical BN particles were obtained with the number ratios, and with the average particle size, specific surface area, C content, and compressive strength as shown in Table 1.

The resulting sintered spherical BN particles were ground and identified as h-BN as the result of x-ray analysis.

Note that the impurities contained in the particles were identified as follows:

C: measured by an infrared absorption method using a tubular electric resistance furnace (manufactured by Shimadzu Corporation);

O: measured by an inert gas-impulse heat melting method using an O/N analyzer (EMGA-550, manufactured by Horiba, Ltd.); and Fe, Ni, Cr, W, Mo, etc.: measured by quantitative analysis based on glow discharge mass spectrometry (GD-MS).

In addition, physical properties such as shape were measured as follows:

number ratio of recesses: calculated by counting the number of spherical BN particles, each having a recess on its surface, in the total number of particles observed by image analysis;

particle size: measured by laser analysis in accordance with JIS R 1629;

specific surface area: measured by the gas adsorption BET method in accordance with JIS R 1626;

major diameter of primary particle: measured by combination of electron microscope and image analysis;

shape: measured by microscope and electron microscope;

compressive strength (crushing strength) of sintered particle: measured by a compression tester (a nanoindenter, HM2000) manufactured by Fischer instruments;

pore diameter, pore volume: measured by a mercury porosimeter in accordance with JIS R 1655; and electric resistance of impurity: measured by a semiconductor parameter analyzer manufactured by The Oyama Company Limited.

The processing conditions of the granulated products were measured as follows:

slurry viscosity: rotational viscosity was measured in accordance with JIS R 1652:2003 (Brookfield, single-cylinder rotational viscometer).

TABLE 1

| | Prmary BN Particles | | | | PVA | | Shiny | Spray-Drying | Baking Condition | |
| --- | --- | --- | --- | --- | --- | --- | --- | --- | --- | --- |
| No. | Primary Particle Size (μm) | Specific Surface Area (m²/g) | Oxygen Content (mass %) | $B_2C$ Ratio (mass %) | PVA Ratio (mass %) | Polymerization Degree | Viscosity (Pa·s) | Temp. (° C.) | Temp. (° C.) | Time (h) |
| 1 | 0.8 | 25 | 2.1 | 0.6 | 1.6 | 1000 | 0.02 | 115 | 2000 | 10 |
| 2 | 0.3 | 32 | 3.5 | 0.6 | 1.6 | 1000 | 0.04 | 115 | 2000 | 10 |
| 3 | 0.3 | 32 | 3.5 | 0.6 | 1.6 | 1000 | 0.04 | 115 | 2000 | 10 |
| 4 | 0.3 | 32 | 3.5 | 0.6 | 1.6 | 1000 | 0.05 | 115 | 2000 | 10 |
| 5 | 0.3 | 32 | 3.5 | 0.6 | 1.6 | 1000 | 0.05 | 115 | 2000 | 10 |
| 6 | 0.2 | 30 | 5 | 0.6 | 1.6 | 1000 | 0.07 | 115 | 2000 | 10 |
| 7 | 0.3 | 34 | 3.5 | 0 | 1.6 | 3000 | 0.05 | 115 | 2000 | 10 |
| 8 | 2 | 15 | 1.8 | 0 | 1.6 | 3000 | 0.01 | 115 | 2000 | 10 |
| 9 | 0.05 | 70 | 6 | 0 | 1.6 | 400 | 0.12 | 115 | 2000 | 10 |

TABLE 1-continued

|     | Number Ratio of Particles with Recesses on Surfaces (%) | Sintered Spherical BN Particles | | | | |
| --- | --- | --- | --- | --- | --- | --- |
| No. | | Average Particle Size (μm) | Specific Surface Area (m²/g) | Carbon Content (mass %) | Compressing Strength (MPa) | Remarks |
| 1 | 86 | 62 | 8.2 | 0.01 | 8.2 | Inventive Example 1 |
| 2 | 83 | 61 | 9.4 | 0.01 | 9.8 | Inventive Example 2 |
| 3 | 81 | 60 | 10.1 | 0.01 | 10.6 | Inventive Example 3 |
| 4 | 78 | 60 | 11.4 | 0.01 | 14.1 | Inventive Example 4 |
| 5 | 66 | 59 | 12.8 | 0.01 | 16.3 | Inventive Example 5 |
| 6 | 53 | 57 | 13.9 | 0.01 | 18.8 | Inventive Example 6 |
| 7 | 44 | 64 | 7.5 | 0.01 | 11 | Comparative Example 1 |
| 8 | 37 | 68 | 4 | 0.01 | 0.8 | Comparative Example 2 |
| 9 | 14 | 54 | 16 | 0.01 | 1.3 | Comparative Example 3 |

As can be seen from Table 1, all of the sintered spherical BN particles (Inventive Examples 1 to 6) obtained according to the present invention have high compressive strength.

Example 2

In this case, 40 vol % of the sintered spherical BN particles obtained in Example 1 (inventive examples 1 to 6 and comparative examples 1 to 3) and 20 vol % of scaly BN powder (HP-1, manufactured by Mizushima Ferroalloy Co., Ltd.) were uniformly mixed with resin to prepare resin compositions, respectively. Subsequently, each of the resin compositions was applied on a surface of a copper foil in a sheet-like manner, then compressed and heated to prepare a copper foil sheet with resin.

Note that an epoxy resin, "Epicoat 807" (manufactured by Japan Epoxy Resins Co., Ltd.) was used as the resin. In addition, 1 mass % of a modified alicyclic amine grade, "Epicure 807" (manufactured by Japan Epoxy Resins Co., Ltd.) was added as a hardening agent.

Table 2 shows the measurement results of peel strength, thermal conductivity, and adhesiveness (withstand voltage) of the copper foil sheets with resin thus obtained.

Note that peel strength was measured in accordance with JIS C 6471.

In addition, thermal conductivity was measured under ASTM E1461.

Further, withstand voltage, i.e., breakdown voltage (kV) indicative of the ability of a solid electrical insulating material to withstand voltage was measured in accordance with JIS C 2110.

In this case, peel strength of 1 kN/m or more, thermal conductivity of 5 W/m·K or more, and withstand voltage of 5 kV or more are determined as good results.

TABLE 2

| Copper Foil Sheet with Resin | | Inventive Example 7 | Inventive Example 8 | Inventive Example 9 | Inventive Example 10 | Inventive Example 11 | Inventive Example 12 | Comparative Example 4 | Comparative Example 5 | Comparative Example 6 |
| --- | --- | --- | --- | --- | --- | --- | --- | --- | --- | --- |
| BN Powder Used | | Inventive Example 1 | Inventive Example 2 | inventive Example 3 | Inventive Example 4 | Inventive Example 5 | Inventive Example 6 | Comparative Example 1 | Comparative Example 2 | Comparative Example 3 |
| mass% | Sintered BN Particle | 40 | 40 | 40 | 40 | 40 | 40 | 40 | 40 | 40 |
| | Primary Particle | 20 | 20 | 20 | 20 | 20 | 20 | 20 | 20 | 20 |
| | Resin | 40 | 40 | 40 | 40 | 40 | 40 | 40 | 40 | 40 |
| Properties | Peel Strength (kN/m) | Good | Good | Good | Good | Good | Good | Poor | Poor | Poor |
| | Thermal Conductivity (W/m · K) | Good | Good | Good | Good | Good | Good | Poor | Poor | Poor |
| | Withstand Voltage (kV) | Good | Good | Good | Good | Good | Good | Poor | Good | Poor |

It can be seen from Table 2 that all of the copper foil sheets with resin (inventive examples 7 to 12) filled with the sintered spherical BN particles obtained according to the present invention (inventive examples 1 to 6) in a dispersed manner have high peel strength, and show excellent thermal conductivity and excellent adhesiveness to the resin.

The invention claimed is:

1. Sintered spherical BN particles comprising secondary particles formed of aggregated primary BN particles, wherein the number ratio of particles, each having a recess on its surface, is 50% or more in the sintered spherical BN particles, and each of the sintered spherical BN particles has a compressive strength of 0.1 MPa to 100 MPa.

2. The sintered spherical BN particles according to claim 1, wherein the sintered spherical BN particles have an average particle size of 1 μm to 100 μm.

3. The sintered spherical BN particles according to claim 1, wherein the sintered spherical BN particles have a carbon content of 0.1 mass % or less and a specific surface area of 1 $m^2/g$ to 20 $m^2/g$.

4. The sintered spherical BN particles according to claim 2, wherein the sintered spherical BN particles have a carbon content of 0.1 mass % or less and a specific surface area of 1 $m^2/g$ to 20 $m^2/g$.

5. The sintered spherical BN particles according to claim 1, wherein conductive impurities are present as a composite oxide with $B_2O_3$ in the spherical BN particles in stable state.

6. The sintered spherical BN particles according to claim 2, wherein conductive impurities are present as a composite oxide with $B_2O_3$ in the spherical BN particles in stable state.

7. The sintered spherical BN particles according to claim 3, wherein conductive impurities are present as a composite oxide with $B_2O_3$ in the spherical BN particles in stable state.

8. The sintered spherical BN particles according to claim 4, wherein conductive impurities are present as a composite oxide with $B_2O_3$ in the spherical BN particles in stable state.

9. A method of producing sintered spherical BN particles, comprising:
blending BN powder containing primary particles having a major diameter of 0.01 μm to 5.0 μm with 0.1 mass % to 10 mass % of boron carbide ($B_4C$) as a sintering additive and 0.1 mass % to 5.0 mass % of an organic binder as a molding additive, and then adding water to form a slurry having a viscosity of 0.01 Pa·s to 5.0 Pa·s;
using a spray drying process to spray-dry the slurry at a drying temperature of 100° C. to 300° C. to form spherical BN granules;
baking the spherical BN granules at a temperature of 1600° C. to 2200° C.; and
then, optionally, grinding or crushing the baked spherical BN granules.

10. The method of producing sintered spherical BN particles according to claim 9, wherein polyvinyl alcohol (PVA) with a polymerization degree of 500 to 2000 is used as the organic binder.

11. The method of producing sintered spherical BN particles according to claim 9, wherein the primary BN particles have a specific surface area of 10 $m^2/g$ to 70 $m^2/g$ and an oxygen content of 1 mass % to 7 mass %.

12. The method of producing sintered spherical BN particles according to claim 10, wherein the primary BN particles have a specific surface area of 10 $m^2/g$ to 70 $m^2/g$ and an oxygen content of 1 mass % to 7 mass %.

13. A polymer material obtained by dispersing the sintered spherical BN particles according to claim 1 in a thermosetting resin, a thermoplastic resin, or a rubber.

14. A polymer material obtained by dispersing the sintered spherical BN particles according to claim 2 in a thermosetting resin, a thermoplastic resin, or a rubber.

15. A polymer material obtained by dispersing the sintered spherical BN particles according to claim 3 in a thermosetting resin, a thermoplastic resin, or a rubber.

16. A polymer material obtained by dispersing the sintered spherical BN particles according to claim 4 in a thermosetting resin, a thermoplastic resin, or a rubber.

17. A polymer material obtained by dispersing the sintered spherical BN particles according to claim 5 in a thermosetting resin, a thermoplastic resin, or a rubber.

18. A polymer material obtained by dispersing the sintered spherical BN particles according to claim 6 in a thermosetting resin, a thermoplastic resin, or a rubber.

19. A polymer material obtained by dispersing the sintered spherical BN particles according to claim 7 in a thermosetting resin, a thermoplastic resin, or a rubber.

20. A polymer material obtained by dispersing the sintered spherical BN particles according to claim 8 in a thermosetting resin, a thermoplastic resin, or a rubber.

* * * * *